United States Patent [19]

Hipp et al.

[11] 4,197,038

[45] Apr. 8, 1980

[54] FACE MILLING CUTTER HEAD WITH ROD-SHAPED CUTTERS

[75] Inventors: Anton Hipp, Klaffenbach; Hans Leppin, Zella-Mehlis; Klaus Peuckert, Karl-Marx-Stadt, all of Fed. Rep. of Germany

[73] Assignee: VEB Werkzeugkombinat Schmalkalden, Schmalkalden, Fed. Rep. of Germany

[21] Appl. No.: 884,221

[22] Filed: Mar. 7, 1978

[51] Int. Cl.² ............................................. B26D 1/12
[52] U.S. Cl. ........................................................ 407/22
[58] Field of Search ................................... 407/21, 22

[56] References Cited

U.S. PATENT DOCUMENTS

| | | | |
|---|---|---|---|
| 4,060,881 | 12/1977 | Ryan et al. | 407/22 |
| 4,093,391 | 6/1978 | Bachmann et al. | 407/22 |

*Primary Examiner*—Leonidas Vlachos

[57] ABSTRACT

A face milling cutter head for producing trapezoidal grooves, e.g. for toothing in bevel gears having arcuate tooth flank lines, the head having a main axis and comprising a substantially disk-shaped carrier body portion with a locking ring surrounding the same; the body portion having therein at least two grooves for a corresponding number of removably inserted, substantially axially extending, rod-shaped milling cutters having respective longitudinal shaft axes, the grooves being substantially equidistant from the main axis; the cutters having chip bearing surfaces that are tilted with respect to the shaft axes, head and respective flank clearance surfaces, head and corresponding flank cutting edges, and at least three shaft surfaces; wherein cutting lines are formed on the cutters between the head and flank clearance surfaces, the cutting lines forming reference planes with the shaft axis; and wherein the spatial arrangement of the cutters, surfaces and edges is such that the reference planes run substantially parallel with at least one of the shaft surfaces and with the main head axis; the planes being constituted, on the one hand, between the cutting lines and, on the other hand, by a second line that is parallel with the main head axis and passes through the cutting lines. Additional, optional features are also disclosed.

6 Claims, 7 Drawing Figures

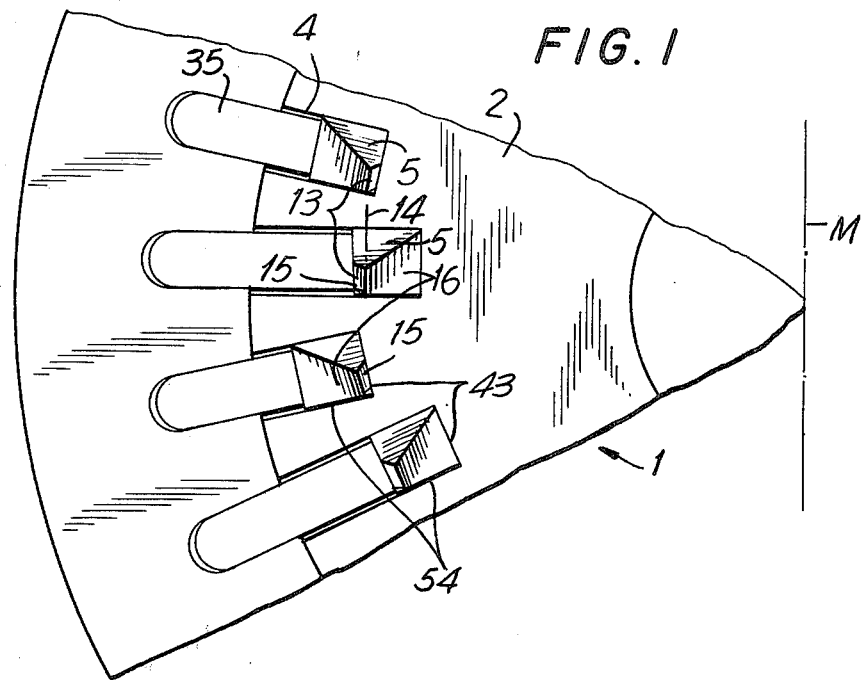
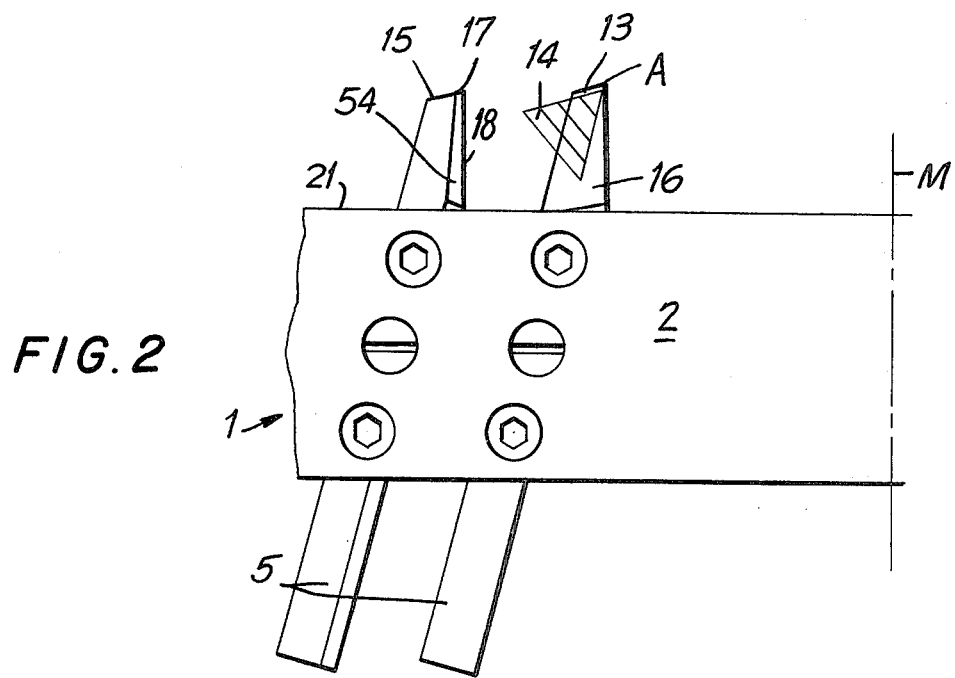

FACE MILLING CUTTER HEAD WITH ROD-SHAPED CUTTERS

The invention relates to a face milling cutter head having novel rod-shaped cutters therein, for producing trapezoidal grooves, particularly for preparing toothing, such as in bevel gears having arcuate tooth flank lines, that is, which are curved on the arc of a circle.

For preparing such trapezoidal grooves, particularly for gear toothing, cutter heads are used, with the cutters protruding beyond the front faces of the heads. Each milling cutter has a head clearance surface and one or two domed flank clearance surfaces. These clearance surfaces together with the chip bearing surface constitute the cutting edges.

With a view to eliminating expensive reconditioning expenses and equipment, such cutter heads are customarily resharpened only on the planar chip bearing surfaces of the cutters, thereby maintaining cutter geometry, that is, the original cutter profile and its radial position with respect to the cutter-head axis. True-running errors that occur upon sharpening are corrected with the aid of adjusting elements such as for example key plates.

Milling cutters with domed clearance surfaces have the disadvantage that relatively much of the valuable material has to be taken off from their chip bearing surfaces for reconditioning purposes because the entire land-wear width has to be removed on the clearance surfaces by re-applying the chip bearing surface. The number of possible re-applying operations is limited with these cutter heads, resulting in relatively high tool expenditures during milling, large amounts of high-quality cutter material being used to this end.

These drawbacks have led to the development of cutter heads that have rod-shaped cutters and planar clearance surfaces. Together with the similarly planar chip bearing surface, which is at an angle with respect to the shaft axis, these clearance surfaces constitute the useful milling cutting edges.

The reconditioning of a cutter head having rod-shaped cutters is performed by resharpening these cutters outside the head, namely in a special attachment, the regrinding being performed on the clearance surfaces and on the chip bearing surface.

It is also known to apply a procedure for the reconditioning of cutter heads having rod-shaped cutters, by which the clearance surfaces are reduced by grinding, in comparison to the removal from the chip bearing surface, by an amount as a result of which the cutting edge is shifted along the shaft axis, while maintaining its cutter geometry, as has been disclosed in the West-German Patent Publication No. 1,577,451.

The rod-shaped milling cutters reconditioned by this procedure are inserted into the cutter head after sharpening, the cutting edges being of course brought into their original positions. This is accomplished in that the cutters are pushed in the respective receiving grooves of the head, along the axes of the rods, against stationary stops, where they are clamped.

These cutter-head constructions eliminate the deficiencies of the known heads only partly, namely of those that are fitted with cutters having domed clearance surfaces. It should be noted in these respects that the direct, proportional coordination of the removed amounts at the chip bearing surface to the amounts at the clearance surfaces requires the material of the rod-shaped cutters to be similarly removed despite the circumstance that the amount of wear of the surfaces to be ground does not make this necessary.

A further disadvantage of known rod-shaped milling cutters consists in that a complicated grinding arrangement is necessary for their reconditioning. The reason herefor is based on the fact that the flank clearance surfaces have an undesirable position on the rod-shaped cutter, relative to the head clearance surface and the cutter shaft, resulting in that all rod-shaped cutters to be reshaped require a special locating or supporting surface.

These known milling cutter heads furthermore suffer from the drawback that there is no sensitive adjustability for the cutters. This has disadvantageous effects so far as the true-running or concentricity accuracy of the cutting edges is concerned. To reduce such disadvantages when reconditioning cutter heads that have rod-shaped cutters, it has therefore been attempted to use a shaft surface of the rod-shaped cutter also as a cutting surface so that only the straight clearance surfaces had to be resharpened on such cutters, as has been described in the German Patents (Democratic Republic) Nos. 112,923 and 121,731, as well as the U.S. Pat. No. 3,881,889.

It is however a drawback of such cutter heads that they can be used economically only when there is no wear or only a negligible wear at the chip bearing surface because otherwise too much would have to be removed from the clearance surfaces, which would result in that the reconditioning becomes costlier than that of cutters having domed clearance surfaces.

There being no usable technical solutions to avoid the chip bearing surface wear, the described cutter heads have presently no practical importance.

It is one of the objects of the present invention to eliminate the drawbacks and deficiencies of known cutter-head structures, aiming at a simplification of the reconditioning, at further improvements of material economy, and at an attainment of improved adjustability.

It is consequently the task of the present invention to provide cutter heads for the prepartion of trapezoidal grooves, particularly for making gear toothing, such as in bevel gears having arcuate tooth flank lines, with a structurally novel rod-shaped cutter arrangement that ensures the advantages of simplified manufacture while permitting the cutters to be resharpened on the two clearance surfaces and on the chip bearing surface, for purposes or reconditioning, without the need to maintain a direct proportionality between the removed material amounts at the clearance surfaces as compared to the amount removed from the chip bearing surface proper.

It is furthermore an object of the invention to permit regrinding of the cutting edges with simple means, without making use of complicated retaining and clamping devices. The invention also aims at attaining simple, true-position adjustment of the cutting edges within the head.

In accordance with important features of the present invention, this is attained in that in each cutter a plane is made to run parallel with a cutter-shaft surface and also with the cutter-head axis, each plane being constituted, on the one hand, by a cutting line between the head and the flank clearance surfaces and, on the other hand, by a line that is parallel with the longitudinal cutter-shaft axis and passes through that cutting line.

According to a further feature, another cutting line, between the chip bearing surface and another cutter-shaft surface that adjoins the chip bearing surface and runs parallel with the cutter-shaft axis, is substantially orthogonal to that cutter-shaft axis.

Face milling cutter heads with rod-shaped milling cutters according to the present invention allow the chip bearing surface to be resharpened independently of the amounts of material removed from the clearance surfaces, the required position of the cutters in the head in respect of the edge geometry and the profile being attained in that the cutters are pushed somewhat beyond the front face of the cutter head, depending on the actual position of the chip bearing surfaces, whereby the edges are again located in the original cutter-head shaft surfaces, and change their positions only in the direction of the cutter-head axis.

Another advantage attained by the inventive arrangement of the milling cutters consists in that all cutters that have to be sharpened simultaneously can be positioned on a common, planar surface of the grinding attachment, when resharpening the clearance surfaces and also the chip bearing surface, which appreciably simplifies the reconditioning operations.

Yet another inventive feature of the face milling cutter head relates to the provision of pre-tensioning elements for each or at least some milling cutters, in addition to conventional screws that serve to clamp the cutters. The pre-tensioning produced in these elements, e.g. by means of springs, secures the cutters in a non-ambiguous position even in the non-clamped condition, and allows sensitive displacement thereof, as this is required for a position-true adjustment of the cutter head to achieve the required concentricity of all flank cutting edges.

Other objects, features and many of the attendant advantages of the invention will be readily appreciated as the same becomes better understood by reference to the following detailed description, when considered with the accompanying drawings, wherein FIG. 1 shows a partial elevation of the face milling cutter head according to the invention, showing inserted rod-shaped cutters;

FIG. 2 is a partial side view of the cutters illustrated in FIG. 1;

Figure 3:
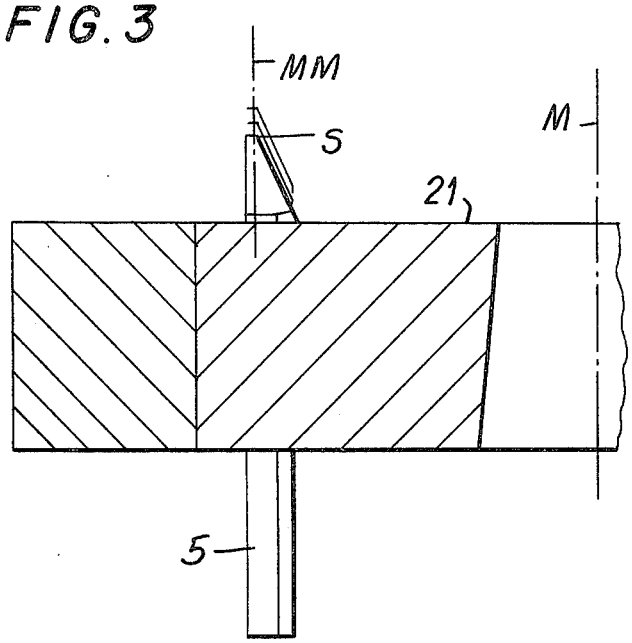
FIG. 3 is an axial section through the inventive cutter head of FIG. 1.

The inventive face milling cutter head generally designated by numeral 1 comprises a disk-shaped carrier body portion 2 and a surrounding locking ring 3. In a peripheral surface of the body portion 2 there are receiving grooves 4 (FIG. 1) that run somewhat in an axial direction, these grooves serving for holding therein removably insertable rod-shaped milling cutters 5.

FIGS. 1 and 2 show structural details such as head clearance surfaces 15, flank clearance surfaces 16, respective head and flank cutting edges 17 and 18 for the cutters 5. The surfaces 15, 16 are coordinated with each other such that cutting lines 13 between the surfaces 15, 16 form planes 14 with a longitudinal cutter-shaft axis A.

Figure 4:
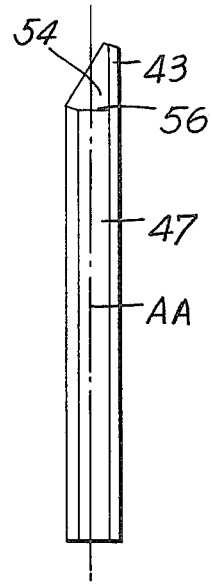
FIG. 4 shows an outer milling cutter for the cutter head of FIG. 1.

In FIG. 4, giving an example of an outer milling cutter 5 for the inventive cutter head 1, an axial line AA is shown, to which reference will be made later, which line is parallel to the cutter-shaft axis A (FIG. 2). FIGS. 1 to 3 include an indication of a cutter-head axis M. FIG. 3 includes, for reference purposes, a straight line MM that is parallel with the axis M. Individual cutting points S are shown in this figure, along the line MM, as will be described.

Figure 5:
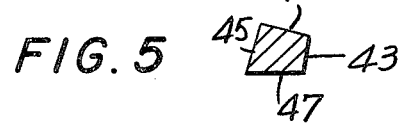
FIG. 5 illustrates the shaft cross-section of the cutter according to FIG. 4.

In FIG. 2, numeral 21 denotes the front face of the carrier body portion 2. Numerals 31 and 34 to 36 will be described later in connection with FIGS. 6 and 7. FIG. 5 as well as other illustrations show respective shaft surfaces 41, 43, 45 and 47, to be explained later in more detail. Finally, a chip bearing or cutting surface 54 is identified in FIG. 2 while numeral 56 is a cutting line (see FIG. 4) defined between the shaft surface 47 and the chip bearing surface 54, and being preferably orthogonal to the line AA.

The rod-shaped milling cutters 5, disposed in the receiving grooves 4 of the carrier body portion 2 that forms part of the inventive face milling cutter head 1, extend beyond the front face 21 of the carrier body portion 2 and display the planar head clearance surface 15 and the similarly planar flank clearance surface 16, constituting the cutting edges 17, 18 together with the similarly planar chip bearing surface 54.

It has been explained earlier that the shaft surface 43 of the cutter 5 is parallel with the shaft axis A and, in the assembled condition, with the cutter-head axis M.

For reconditioning, the cutters 5 are resharpened, outside of the cutter head 1, in a set, namely on the clearance surfaces 15, 16 and on the chip bearing surface 54. During re-assembly, depending upon the momentary position of the surface 54, the cutters 5 are moved to some extent beyond the front face 21 so that the surfaces 17, 18 are again within the original cutter-head axis plane.

As compared to previous or subsequent cutting-surface positions, as can be understood from FIG. 3, the individual cutting points S, parallel with the cutter-head axis M, are shifted along the line MM that is parallel with the axis M.

When resharpening at the clearance surfaces 15, 16, all cutters 5 that are to be processed simultaneously are placed onto a planar surface of a grinding machine or attachment, namely with one of the shaft surfaces 41, 43 or 45, preferably with the parallel surface 43 or 45. The cutters 5 are then slightly tilted in this plane in accordance with the required grinding direction which of course coincides with the direction of the cutting line 13.

When resharpening at the chip bearing surface 54, all simultaneously ground cutters 5 are placed onto the planar surface of the grinding machine or attachment, with the particular shaft surface (e.g. 47) (FIGS. 4 and 5), the latter defining the cutting line 56 with the chip bearing surface 54, the line 56 being preferably orthogonal to the earlier explained line AA.

Figure 6:
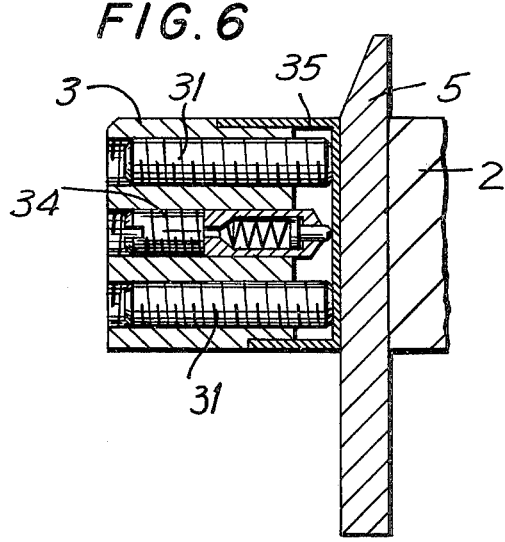
FIG. 6 is an example for securing and pre-tensioning the milling cutters in the inventive cutter head.
Figure 7:
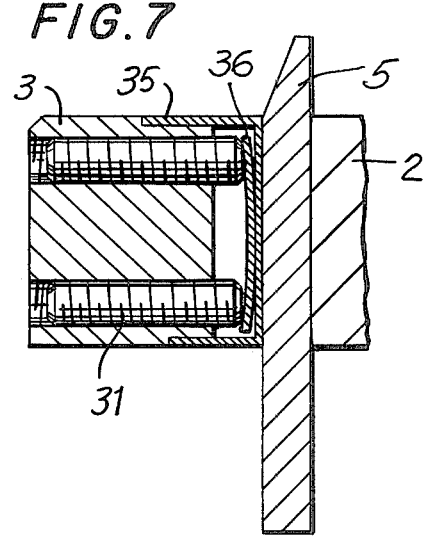
FIG. 7 is another example for the same purpose.

FIGS. 6 and 7 are examples of securing and pre-tensioning the cutters 5 in the carrier body 2 of the inventive face milling cutter head. According to both solutions, conventional clamping screws 31 are used in the locking ring 3 to secure the milling cutter 5. Pre-tensioning elements 34, 35 and 36 can be used to this end, insuring an unambiguous position of the cutter 5 in its not clamped condition, and facilitating precise adjustments, as required.

In FIG. 6, the pretensioning elements are constituted by threaded studs with spring bolts, commonly designated by numeral 34, and pressure members 35, the former acting upon the latter for tightening the cutters 5 against the respective body 2 upon application of a screwdriver.

In the alternative of FIG. 7, especially shaped, profiled springs 36 are used in conjunction with the pressure members 35. The operation of these arrangements will no doubt be understood by those skilled in the art.

It should be understood, of course, that the foregoing disclosure relates only to a preferred embodiment of the invention, and that it is intended to cover all changes, modifications and possible additons of the described examples which do not constitute departures from the spirit and scope of the invention.

What we claim is:

1. A face milling cutter head (1) for producing trapezoidal grooves, e.g. for toothing in bevel gears having arcuate tooth flank lines, the head having a main axis (M); comprising a substantially disk-shaped carrier body portion (2) with a locking ring (3) surrounding the same; said body portion having therein at least two grooves (4) for a corresponding number of removably inserted, substantially axially extending, rod-shaped milling cutters (5) having respective longitudinal shaft axes (A), said grooves being substantially equidistant from the main head axis; said cutters having chip bearing surfaces (54) that are tilted with respect to said shaft axes, head and respective flank clearance surfaces (15, 16), head and corresponding flank cutting edges (17, 18), and at least three shaft surfaces (41, 43, 45, 47); said head cutting edges being formed by one of said chip bearing surfaces meeting with said head clearance surfaces, while said flank cutting edges are formed by said one chip bearing surface meeting with said flank clearance surfaces; wherein cutting lines (13) are formed on said cutters between said head and said flank clearance surfaces, said cutting lines forming reference planes (14) with said main head axis; and wherein the spatial arrangement of said cutters, said surfaces and said edges is such that said reference planes run substantially parallel with at least one (43) of said shaft surfaces and with said main head axis; said planes being constituted, on the one hand, between said cutting lines and, on the other hand, by a second line (MM) that is parallel with said main head axis and passes through said cutting lines.

2. The face milling cutter head as defined in claim 1, wherein second cutting lines (56) are defined between said chip bearing surfaces (54) and another one (47) of said shaft surfaces, which other shaft surface adjoins said chip bearing surfaces and runs parallel with said cutter shaft axis (A), said second cutting lines being substantailly orthogonal to said shaft axis.

3. The face milling cutter head as defined in claim 1, further comprising at least one pre-tensioning element (34, 35, 36) assigned to at least some of said cutters (5) to allow position-true adjustment of the latter within said carrier body portion (2), said elements being in cooperation with said locking ring (3).

4. The face milling cutter head as defined in claim 3, further comprising at least one clamping screw (31) for urging at least one member of said elements (34, 35, 36) against said cutter (5).

5. A face milling cutter head (1) for producing trapezoidal grooves, e.g. for toothing in bevel gears having arcuate tooth flank lines, the head having a main axis (M); comprising a substantially disk-shaped carrier body portion (2) with a locking ring (3) surrounding the same; said body portion having therein at least two grooves (4) for a corresponding number of removably inserted, substantially axially extending, rod-shaped milling cutters (5) having respective longitudinal shaft axes (A), said grooves being substantially equidistant from the main head axis; said cutters having chip bearing surfaces (54) that are tilted with respect to said shaft axes, head and respective flank clearance surfaces (15, 16), head and corresponding flank cutting edges (17, 18), and at least three shaft surfaces (41, 43, 45, 47); wherein cutting lines (13) are formed on said cutters between said head and said flank clearance surfaces, said cutting lines forming reference planes (14) with said main head axis; and wherein the spatial arrangement of said cutters, said surfaces and said edges is such that said reference planes run substantially parallel with at least one (43) of said shaft surfaces and with said main head axis; said planes being constituted, on the one hand, between said cutting lines and, on the other hand, by a second line (MM) that is parallel with said main head axis and passes through said cutting lines; further comprising at least one pre-tensioning element (34, 35, 36) assigned to at least some of said cutters to allow position-true adjustment of the latter within said carrier body portion, said elements being in cooperation with said locking ring; and wherein said pre-tensioning elements include a pressure member (35) between said locking ring and said cutter, and at least one unit (34) constituted by a threaded stud with a spring-action bolt that can be manually adjusted with respect to said pressure member.

6. A face milling cutter head (1) for producing trapezoidal grooves, e.g. for toothing in bevel gears having arcuate tooth flank lines, the head having a main axis (M); comprising a substantially disk-shaped carrier body portion (2) with a locking ring (3) surrounding the same; said body portion having therein at least two grooves (4) for a corresponding number of removably inserted, substantially axially extending, rod-shaped milling cutters (5) having respective longitudinal shaft axes (A), said grooves being substantially equidistant from the main head axis; said cutters having chip bearing surfaces (54) that are tilted with respect to said shaft axes, head and respective flank clearance surfaces (15, 16), head and corresponding flank cutting edges (17, 18), and at least three shaft surfaces (41, 43, 45, 47); wherein cutting lines (13) are formed on said cutters between said head and said flank clearance surfaces, said cutting lines forming reference planes (14) with said main head axis; and wherein the spatial arrangement of said cutters, said surfaces and said edges is such that said reference planes run substantially parallel with at least one (43) of said shaft surfaces and with said main head axis; said planes being constituted, on the one hand, between said cutting lines and, on the other hand, by a second line (MM) that is parallel with said main head axis and passes through said cutting lines; further comprising at least one pre-tensioning element (34, 35, 36) assigned to at least some of said cutters to allow position-true adjustment of the latter within said carrier body portion, said elements being in cooperation with said locking ring; and wherein said pre-tensioning elements include a pressure member (35) between said locking ring and said cutter, and a profiled spring element (36) that urges said pressure member toward said cutter.

* * * * *